United States Patent
Tamaki et al.

(10) Patent No.: US 7,233,582 B2
(45) Date of Patent: Jun. 19, 2007

(54) WIRELESS COMMUNICATION SYSTEM AND TRANSMISSION POWER CONTROL METHOD THEREFOR

(75) Inventors: Satoshi Tamaki, Kokubunji (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 1076 days.

(21) Appl. No.: 10/331,769

(22) Filed: Dec. 31, 2002

(65) Prior Publication Data
US 2004/0037248 A1    Feb. 26, 2004

(30) Foreign Application Priority Data
Aug. 23, 2002  (JP)  .................. 2002-242804

(51) Int. Cl.
*H04Q 7/00* (2006.01)
*H04B 1/00* (2006.01)

(52) U.S. Cl. ....................... 370/332; 375/146
(58) Field of Classification Search ........ 370/332–336, 370/310; 455/522, 509, 67, 62; 375/95, 375/146
See application file for complete search history.

(56) References Cited

U.S. PATENT DOCUMENTS 4,688,207 A * 8/1987 Yoshimoto .................. 370/310
5,267,262 A   11/1993 Wheatley, III
5,548,807 A * 8/1996 Ueda ......................... 370/334
5,559,790 A    9/1996 Yano et al.
6,035,210 A * 3/2000 Endo et al. .................. 455/522
2004/0018850 A1* 1/2004 Ishiguro et al. ............. 455/522
2004/0176033 A1* 9/2004 Tamaki et al. ............... 455/59

FOREIGN PATENT DOCUMENTS

JP            10-215219         8/1998

* cited by examiner

*Primary Examiner*—Chi Pham
*Assistant Examiner*—Prenell Jones
(74) *Attorney, Agent, or Firm*—Mattingly, Stanger, Malur & Brundidge, P.C.

(57) ABSTRACT

The total amount of power for communications transmitted over channels susceptible to quality fluctuation is decreased to reduce interference with other communications and increase the system's overall capacity. When channel-encoded data is to be transmitted, the quality of a transmission channel is judged. The data is transmitted when the judged quality is higher than predefined. However, if the quality is lower than predefined, the data transmission to a wireless section is suppressed to avoid a signal transmission that cannot effectively be used at a receiving station, decrease the average transmission power, and reduce interference with other communications. Even if the channel quality is lower than predefined at the time of assigning a code word created by channel encoding, the same code word assignment operation as for a transmission portion is performed with respect to a no-transmission portion that a transmitting station does not send to a wireless section.

14 Claims, 9 Drawing Sheets

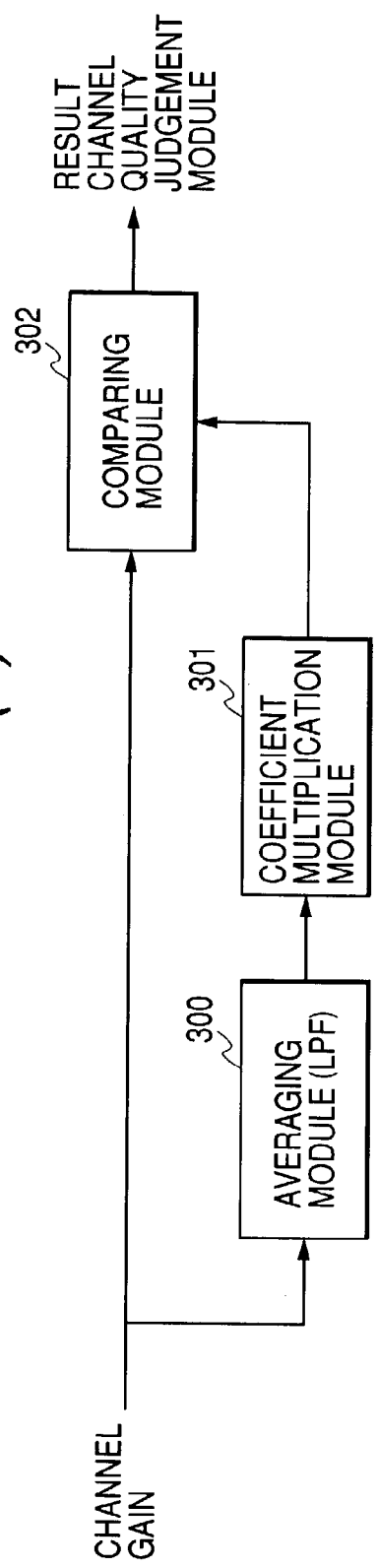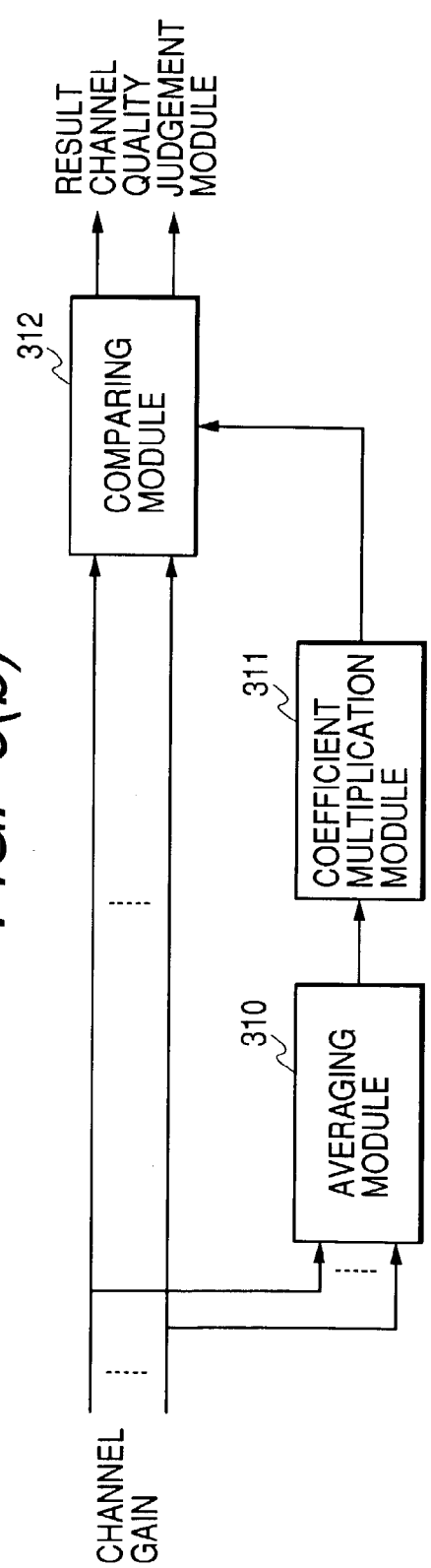

WIRELESS COMMUNICATION SYSTEM AND TRANSMISSION POWER CONTROL METHOD THEREFOR

BACKGROUND OF THE INVENTION

The present invention relates to a transmission power distribution method and reception method and a signal to be used at wireless stations of a wireless communication system; and, more particularly, the invention relates to a communication system, transmitting station, and receiving station that use error correcting codes.

A known technology for controlling a wireless communication device's transmission power is available for achieving a desired reception quality for a wireless communication system. For example, U.S. Pat. No. 5,267,262 discloses a technology for allowing a base station of a CDMA mobile communication system to measure the signal reception power from a terminal and to issue a transmission power increase instruction to a mobile station when the measured power value is smaller than a desired value, or to issue a transmission power decrease instruction to a mobile station when the measured power value is greater than a desired value, so as to permit the mobile station to control the transmission power in compliance with the above-mentioned transmission power control instruction, thereby ensuring that the power received by the base station is virtually constant.

Another technology, which is disclosed by U.S. Pat. No. 5,559,790, has a mobile station measure the reception quality of a pilot signal transmitted by a base station at a known power level and transmit a transmission power control signal to the base station in accordance with the measured reception quality, so as to request a higher transmission power when the reception quality is poorer than when the reception quality is adequate. Thus, the base station is able to control the transmission power for a signal directed to the mobile station in accordance with the received transmission power control signal, thereby ensuring that the quality of a signal received from the base station is maintained virtually constant for the mobile station.

The above technologies make it possible to provide a consistent reception quality by maintaining the power received by a receiving station constant and to avoid reception quality deterioration due to a channel gain fluctuation and intra-system interference due to an unduly high transmission power. To maintain the reception quality constant, however, it is necessary to send transmissions at a high transmission power level depending on a temporary decrease in the channel gain. Such temporary high transmission power causes interference with other communications.

Another technology, which is disclosed by JP-A No. 215219/1998, temporarily stops transmission to prevent other communications from being interfered with by unduly high transmission power when the transmission power exceeds a predefined reference level as a result of control for reception quality maintenance.

To increase the maximum number of simultaneous communications, it is necessary to reduce the transmission power for individual communications to the fullest possible extent, thereby minimizing interference with the other communications.

The conventional technologies, however, have been developed to increase the communication stability by maintaining the reception quality constant during communications. This means that the transmission power needs to be increased if the channel quality is poor. This sets a limit on the decrease in the transmission power when using the conventional technologies.

SUMMARY OF THE INVENTION

The object of the present invention is to decrease the total amount of power used for communications transmitted over channels susceptible to quality fluctuation for the purpose of reducing the interference with other communications and increasing the system's overall communication capacity.

When an error correction capability based on a channel code is used, the reception quality need not be consistent within the limits of the channel code error correction capacity. Consistent post-decoding reception quality can rather be obtained at a lower transmission power level by discarding a low-quality portion.

In the wireless communication system of the present invention, the above-described error-correcting code capability is used so that a transmitting station judges the transmission channel quality at the time of transmitting channel-encoded data. When the quality is found to be higher than a predefined level, the transmitting station transmits the data. However, if the quality is found to be lower than a predefined level, transmission of the data to a wireless section is suppressed. When the required quality level is recovered later, the transmitting station transmits data that follows the unsent data. In this manner, the signal that cannot be effectively used at a receiving station will be left untransmitted. As a result, the average transmission power decreases, reducing interference with other communications.

Even if the channel quality is lower than a predefined level at the time of assigning a code word created by a channel encoding process, the wireless communication system of the present invention performs the same code word assignment operation as for a transmission portion with respect to a no-transmission portion that a transmitting station does not send to a wireless section. When the channel code is decoded at a receiving station, the receiving station can restore the entire data without having to know which portion was not sent to a wireless section.

In an environment, for instance, where a TDD (Time Division Duplex) method is adopted for time division duplexing of the same bandwidth to provide duplex transmissions and receptions so that the transmission channel quality can be estimated from the received signal quality, the present invention can be applied so as to cause a receiving station to send a signal having a known transmission power level to a transmitting station, and to permit the transmitting station to judge the channel quality from the quality of the received signal and determine whether or not to send a transmission to a wireless section.

In an environment, for instance, where an FDD (Frequency Division Duplex) method is adopted for duplexing with different bandwidths employed for transmissions and receptions, so that the transmission channel quality is not estimated from the received signal quality, the present invention can be applied so as to cause a transmitting station to send a signal having a known power level to a receiving station, permit the receiving station to judge the channel quality from the quality of the received signal and send the resulting quality information to the transmitting station, and allow the transmitting station to determine in accordance with the quality information whether or not to send a transmission to a wireless section.

BRIEF DESCRIPTION OF THE DRAWINGS

FIG. 6(a) is a block diagram which shows a typical channel quality judgment process according to the first preferred embodiment;

FIG. 6(b) is a block diagram which shows a typical channel quality judgment process according to the first preferred embodiment;

DETAILED DESCRIPTION OF THE PREFERRED EMBODIMENTS

Referring to the figures, a control method and a wireless station configuration and its component operations will be described according to the present invention. A station for transmitting a data signal according to the present invention will be referred to as a transmitting station, and a station for receiving such a data signal will be referred to as a receiving station. Although the following description deals with the configuration used when the present invention is applied to data signal communication from a transmitting station to a receiving station, the present invention can also be applied to bidirectional data signal communication between a first station and a second station.

Figure 1:
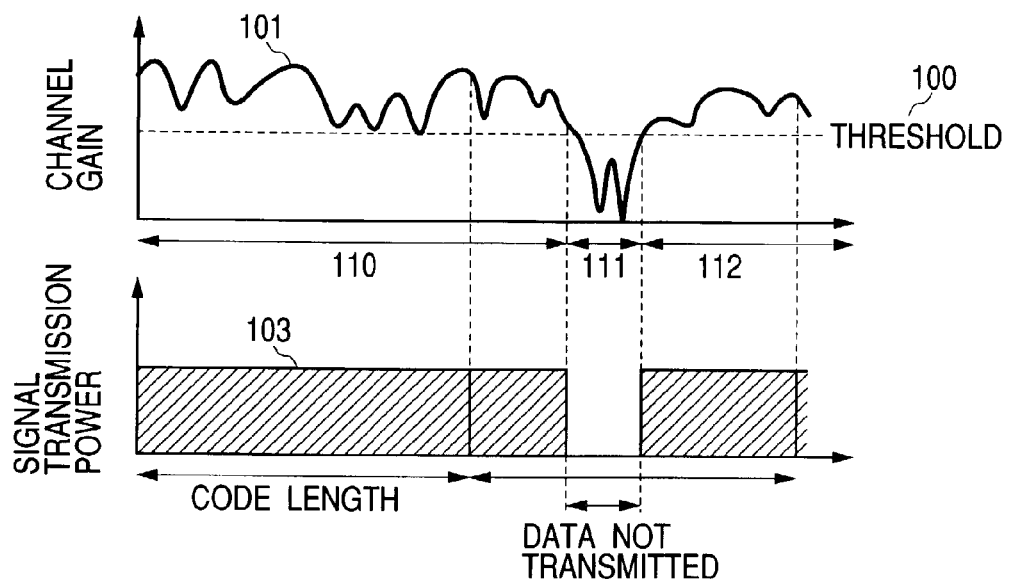
FIG. 1 graph which shows channel gain fluctuation with time, which serves to illustrate a control method of the present invention.

Referring first to FIG. 1, a typical transmission power control method according to the present invention will be described. In wireless communication, the gain of a channel between a transmitting station and a receiving station fluctuates as indicated by the curve 101, due, for instance, to the influence of fading. For communication via the above channel, the attenuation of a transmitted signal before reaching the receiving station is greater in the communication in section 111, in which the gain is small, than in the communication in sections 110 and 112, in which the gain is great. Therefore, the contribution of the communication in section 111 to information conveyance is relatively small per unit of transmission power.

Even when two or more communications are simultaneously transmitted, fading-induced or other channel gain fluctuations occur in individual channels used for communications. Therefore, the transmission power in section 111, in which the channel gain is small, contributes little to information conveyance, but the interference with the other communications is not always reduced.

Therefore, when control is exercised so as to set the transmitting station's transmission power 103 for section 111, in which the channel gain is small, to zero and to set the transmitting station's transmission power 103 for sections 110 and 112, in which the channel gain is not small, to non-zero, the transmission contributing little to information conveyance can be eliminated so as to reduce the average transmission power. Reducing the average transmission power decreases the interference with the other communications. Further, when a communication signal is subjected to error correction coding in situations where sections having a transmission power setting of 0 are substantially small relative to the error-correcting code's error correction capability, the communication speed will not be decreased by selecting a transmission power setting of 0 for some sections. As a result, the desired effect of the present invention is achieved.

For implementation of the above-described control method, the channel gain is measured to judge the channel quality and to control the transmission power in accordance with the judgment result. Two control methods are available. In one method, a transmitting station measures the gain of a channel from a receiving station to the transmitting station and controls the transmitting station's transmission power. In the other method, the receiving station measures the gain of a channel from the transmitting station to the receiving station and communicates the measurement result to the transmitting station, permitting the transmitting station to control the transmission power in accordance with the received measurement result.

The channel gain measurement for the above-described control method can be effected by transmitting a signal having a fixed transmission power level to a station that measures the channel gain, and causing the channel-gain-measuring station to compare the received power against the fixed transmission power level. If the channel-gain-measuring station does not know the fixed transmission power level, the channel gain can be measured by reporting the transmission power to the channel-gain-measuring station as well, and causing the channel-gain-measuring station to compare the received power against the reported transmission power. Further, this control method can use the relative magnitude of a channel gain without having to use a channel gain absolute value. For control purposes, therefore, signals having a fixed transmission power ratio can be transmitted to the channel-gain-measuring station to let the channel-gain-measuring station measure the channel gain's relative magnitude in accordance with the received power ratio of the signals.

The signal used for the channel gain measurement hereinafter will be referred to as a pilot signal. A data signal or other control signal can be used as the pilot signal as long as the transmission power or the transmission power ratio of signals is known or can be determined by the channel-gain-measuring station.

As regards the situations where the control method of the present invention is used for causing a transmitting station to measure the channel gain in accordance with a received signal and exercise transmission signal control, the process flow and configuration of a first preferred embodiment will be described with reference to the accompanying drawings.

Figure 2:
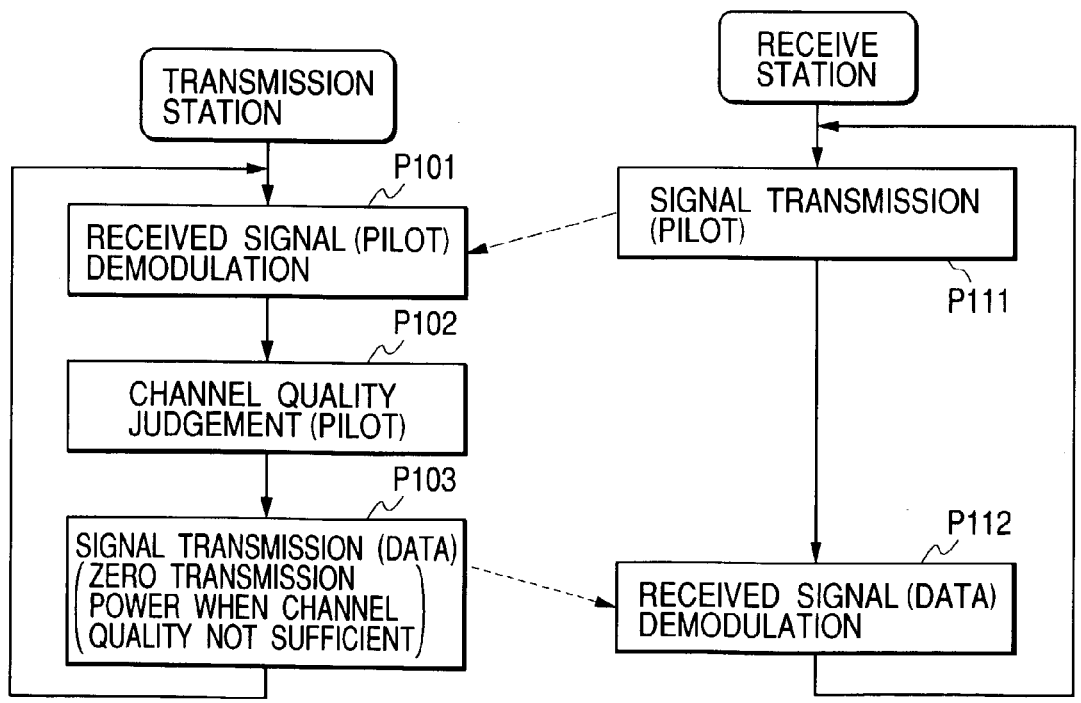
FIG. 2 is a block diagram which shows a typical flow of processes performed by a transmitting station and receiving station according to a first preferred embodiment.

FIG. 2 shows a flowchart that depicts typical processes performed by a transmitting station and a receiving station according to the first preferred embodiment.

A data-receiving station first performs process P111 to transmit a signal, which contains a pilot signal for channel quality estimation. In process P101, a data-transmitting station receives the transmitted signal containing the pilot signal. In accordance with the signal received in process P101, the data-transmitting station judges the channel quality in process P102. In process P103, the data-transmitting station transmits data with the data transmission power set to non-zero, if the quality indicated by the judgment result is higher than the threshold, or with the data transmission power set to zero, if the indicated quality is lower than the threshold.

The processes performed by the transmitting station and receiving station need not always be started and terminated in the sequence indicated by the flowchart in FIG. 2. The successively operating processes may exchange messages with each other as needed to perform a series of processing steps.

Figure 3:
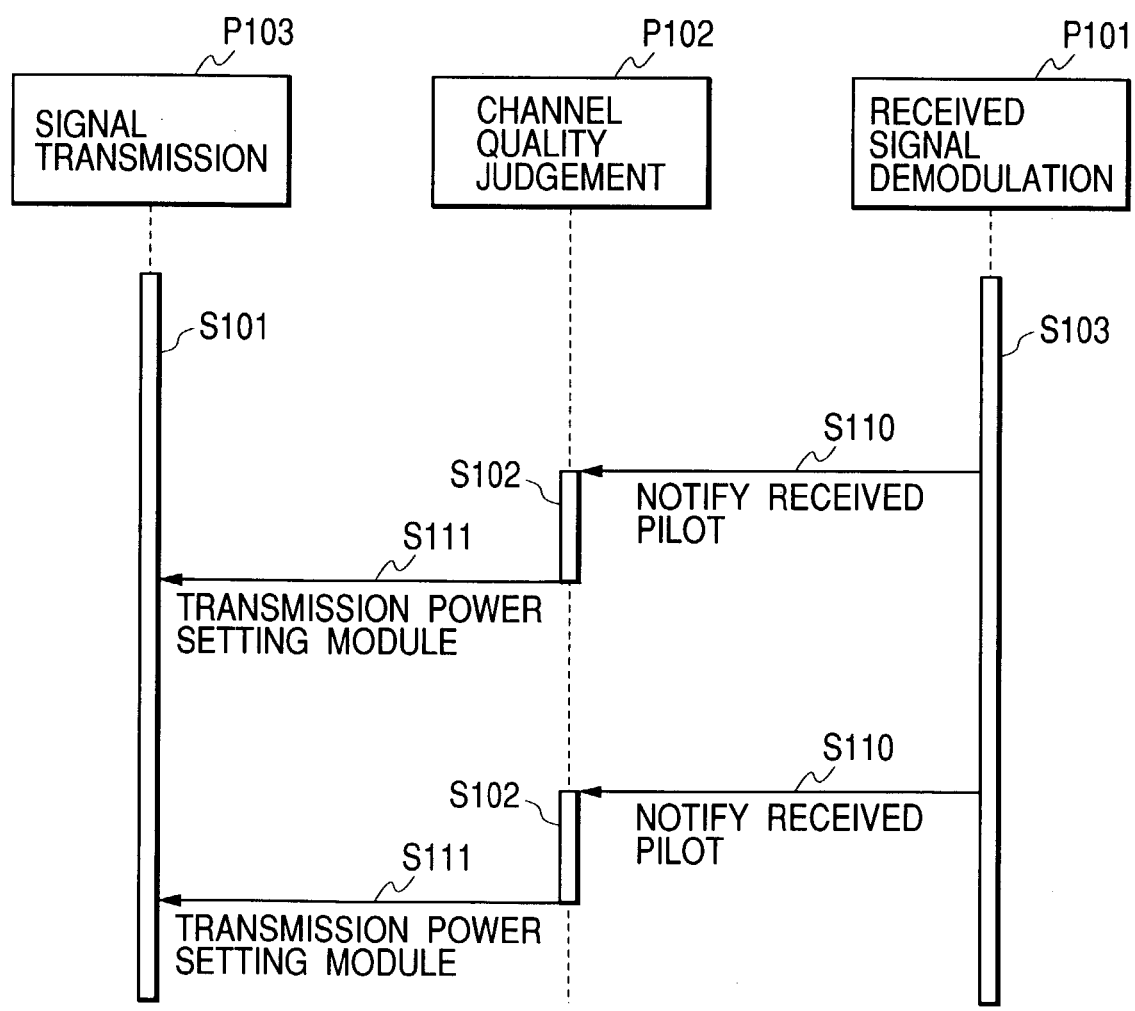
FIG. 3 is a timing diagram which shows a typical sequence of a transmitting station according to the first preferred embodiment.

As an example, the sequence diagram in FIG. 3 will be referred to describe processing steps that the transmitting station performs repeatedly. Referring to the transmitting station's processing steps shown in FIG. 3, the transmitting station repeatedly performs a signal transmission processing step S101 while the transmitting station is sending a signal to the receiving station, and a received signal demodulation processing step S103 while the receiving station is sending a signal to the transmitting station. Upon receipt of a pilot signal adequate for channel quality judgment, a received signal demodulation process P101 sends a received pilot notification message S110 to a channel quality judgment process P102 to indicate that the pilot signal has been received. Upon receipt of the received pilot notification message, the channel quality judgment process starts exercising its processing function. Upon completion of channel quality judgment, the channel quality judgment process sends a transmission power setting message S111 to a signal transmission process to notify it of the transmission power to be used for signal transmission, and then the procedure is completed. Upon receipt of the transmission power setting message, the signal transmission process controls the power of the signal to be transmitted. In this manner, the signal transmission process can be performed on the basis of the power of a pilot signal received between successive transmission processes.

Figure 4:
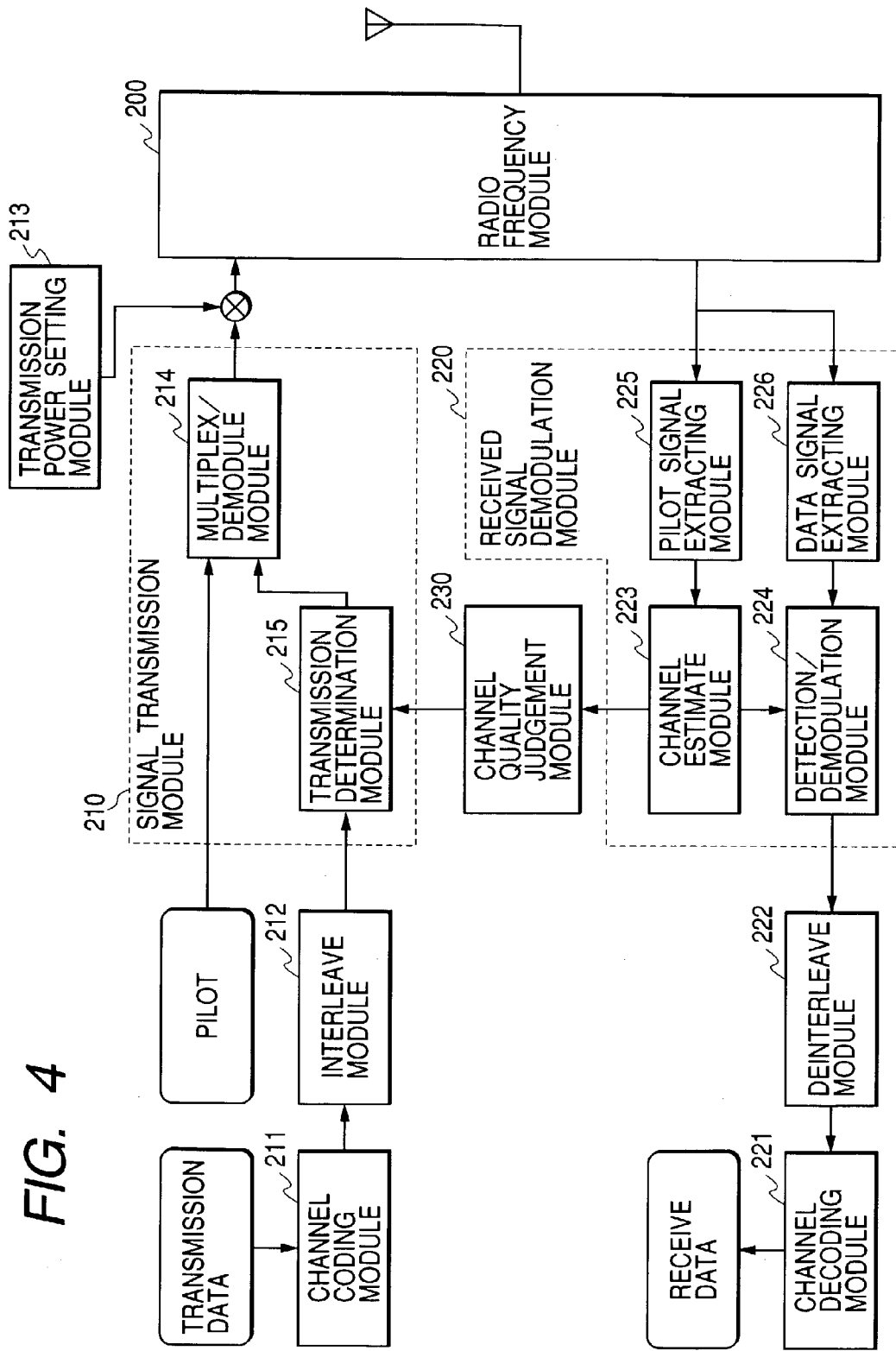
FIG. 4 is a block diagram which shows a typical transmitting station configuration according to the first preferred embodiment.
Figure 5:
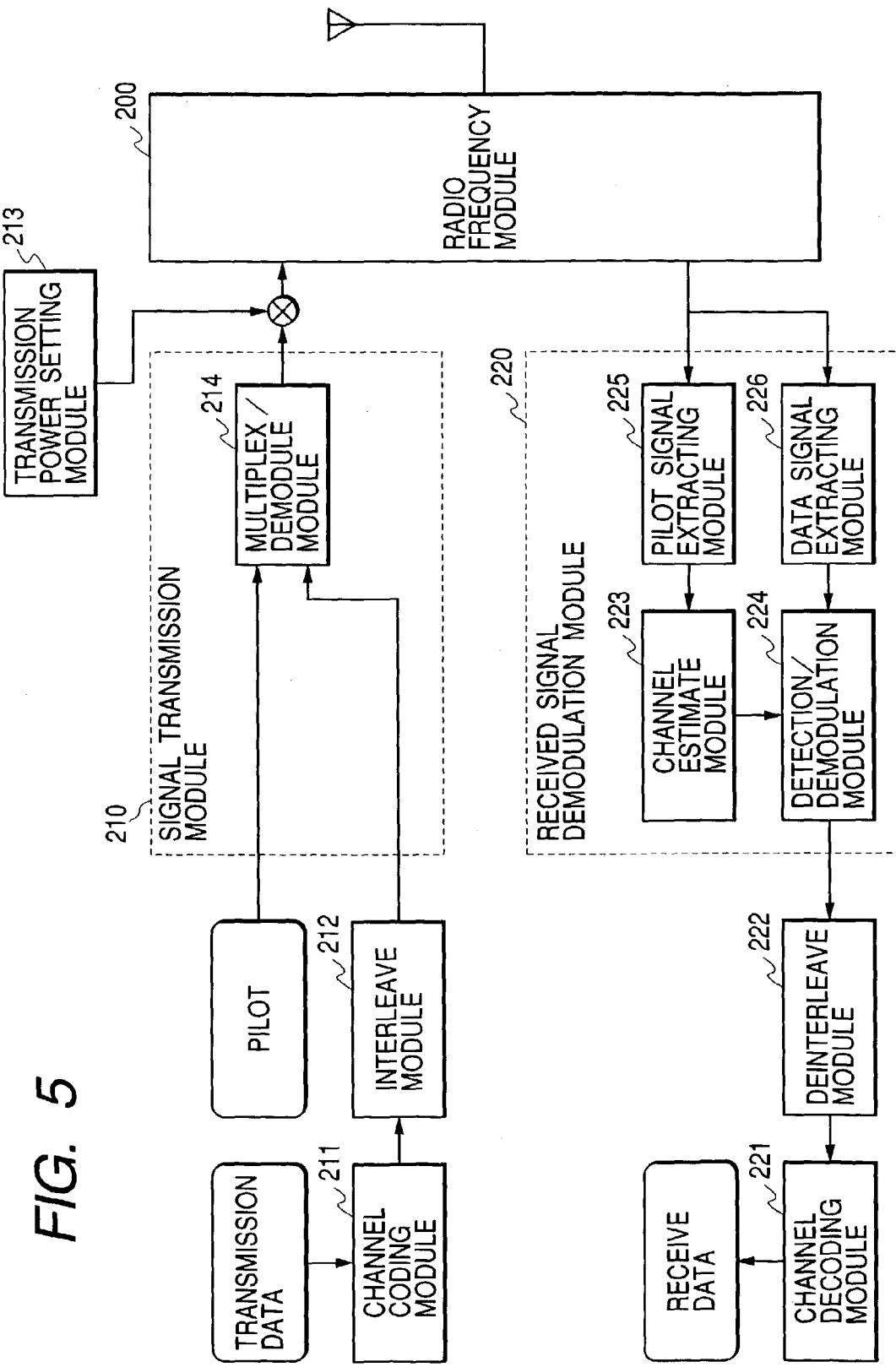
FIG. 5 is a block diagram which shows a typical receiving station configuration according to the first preferred embodiment.

As regards a wireless station embodiment for implementing a control method according to the first preferred embodiment of the present invention, FIG. 4 shows a typical transmitting station configuration and FIG. 5 shows a typical receiving station configuration.

In the transmitting station shown in FIG. 4, transmission data is subjected to channel encoding and interleaving, respectively, in a channel coding module 211 and an interleave module 212. An encoded transmission data signal is then generated and input into a transmission signal generating module 210.

In a signal transmission module 210, the pilot signal and encoded transmission data signal are multiplexed and modulated to generate a baseband transmission signal. In this instance, a transmission determination module 215 receives the channel quality judgment results of one or more data transmission channels from a channel quality judgment module 230, and gives a non-zero amplitude to the encoded transmission data signal on a channel whose quality is found to be appropriate for transmission or a zero amplitude to the encoded transmission data signal on a channel whose quality is found to be inappropriate for transmission. As a result, a data transmission for communication on a single channel will not be sent to a wireless section for a period of time during which the channel quality is low, and a data transmission will not be sent to a channel whose quality is low, for a communication using two or more channels.

A transmission power setting module 213 furnishes the baseband transmission signal, which is generated in the transmission signal generating module 210, with transmission power necessary for reception at a receiving station. The baseband transmission signal is then converted to a radio frequency signal in a radio frequency module 200 and transmitted via an antenna.

To fully achieve the effect of the present invention, it is desirable that the channel quality judgment module 230 judges the channel quality at intervals smaller than the code length used in the channel coding module 211. Even when the data transmission to a wireless section is suppressed due to poor channel quality, the channel quality may be restored after a period shorter than the code length. In such an instance, the entire transmission data can be restored, including the data that was skipped in the period during which the transmission was suppressed, by resuming the transmission of the subsequent data signal and causing a receiving station to correct errors. This is accomplished without having to perform a retransmission or other sequence for a data signal within a period during which a data transmission is suppressed.

Meanwhile, the radio frequency signal received by the antenna for the transmitting station shown in FIG. 4 is converted to a baseband reception signal by the radio frequency module 200.

A channel estimate module 223 measures the baseband reception signal to determine the channel gain or noise power and then conveys this data to the channel quality judgment module 230 as channel quality information. In accordance with the conveyed channel quality information, the channel quality judgment module 230 judges whether the channel quality is appropriate for transmission, and then sends the channel quality judgment result to the transmission determination module 215, thereby providing transmission power control according to the channel quality.

In the receiving station shown in FIG. 5, a radio frequency module 200 converts a received signal to a baseband reception signal. The data signal contained in the baseband reception signal is demodulated by a received signal demodulation module 220. As a result of demodulation, a reception data signal is generated. The reception data signal is de-interleaved in a de-interleave module 222 and subjected to channel decoding in a channel decoding module 221. Reception data is then generated. A signal given a zero amplitude at the time of transmission cannot properly be demodulated by the received signal demodulation module 220. However, such a signal is subjected to error correction during a decoding process performed by the channel decoding module 221. As a result, adequate communication is achieved.

A typical channel quality judgment process performed by the channel quality judgment module 230 according to the first preferred embodiment will be described with reference to the block diagrams shown in FIGS. 6(a) and 6(b).

The block diagram in FIG. 6(a) shows a typical signal flow during a channel quality judgment process that is performed according to the present invention when the channel quality fluctuates with time.

The channel gain reported to the channel quality judgment module is normalized according to the noise power and then reported to an averaging module 300 and to a comparing module 302 as an instantaneous channel gain. To fully achieve the effect of the present invention, it is desirable that the instantaneous channel gain be reported at intervals smaller than the error-correcting code length used for communication. In the averaging module 300, the reported channel gain is averaged with the previously reported channel gain data by the moving-average method and an LPF (low-pass filter). The averaged channel gain value is multiplied by a coefficient multiplication module 301 depending on the modulation and coding methods for communication and the channel gain distribution. The resulting value is then reported to the comparing module 302 as a comparison threshold. The comparing module 302 compares the above instantaneous channel gain against the comparison threshold. If the comparison result indicates that the instantaneous channel gain is greater than the threshold, the comparing module 302 reports a channel quality judgment result to indicate that the channel quality is appropriate for transmission. If the instantaneous channel gain is smaller than the threshold, on the other hand, the comparing module 302 reports a channel quality judgment result to indicate that the channel quality is inappropriate for transmission.

The block diagram in FIG. 6(*b*) shows a typical signal flow during a channel quality judgment process that is performed according to the present invention when the channel quality varies from one channel to another in situations where a plurality of channels are simultaneously used for multicarrier communication or other similar communication.

The channel gains of a plurality of channels reported to the channel quality judgment module are individually normalized according to the noise power and then reported to an averaging module 310 and a comparing module 312 as instantaneous channel gains. The averaging module 310 determines the average channel gains by averaging the reported instantaneous channel gains of the channels and time-averaging the determined average values with the previous average values by the moving-average method and an LPF (low-pass filter). The averaged channel gain values are multiplied by a coefficient multiplication module 311 depending on the modulation and coding methods for communication and the channel gain distribution. The resulting values are then reported to the comparing module 312 as a comparison threshold. The comparing module 302 compares the above instantaneous channel gains of the channels against their respective comparison thresholds. If the comparison result indicates that the instantaneous channel gain of a specific channel is greater than its threshold, the comparing module 312 reports a non-zero transmission power to indicate that the channel quality is appropriate for transmission. If the instantaneous channel gain is smaller than the threshold, on the other hand, the comparing module 312 reports a zero transmission power to indicate that the channel quality is inappropriate for transmission, thus deterring the transmission.

As regards the situations where the control method of the present invention is used for causing a receiving station to measure the channel gain in accordance with a received signal and to report the measurement result to a transmitting station for the purpose of controlling the transmitting station's transmission signal, the process flow and configuration of a second preferred embodiment will be described with reference to the accompanying drawings.

Figure 7:
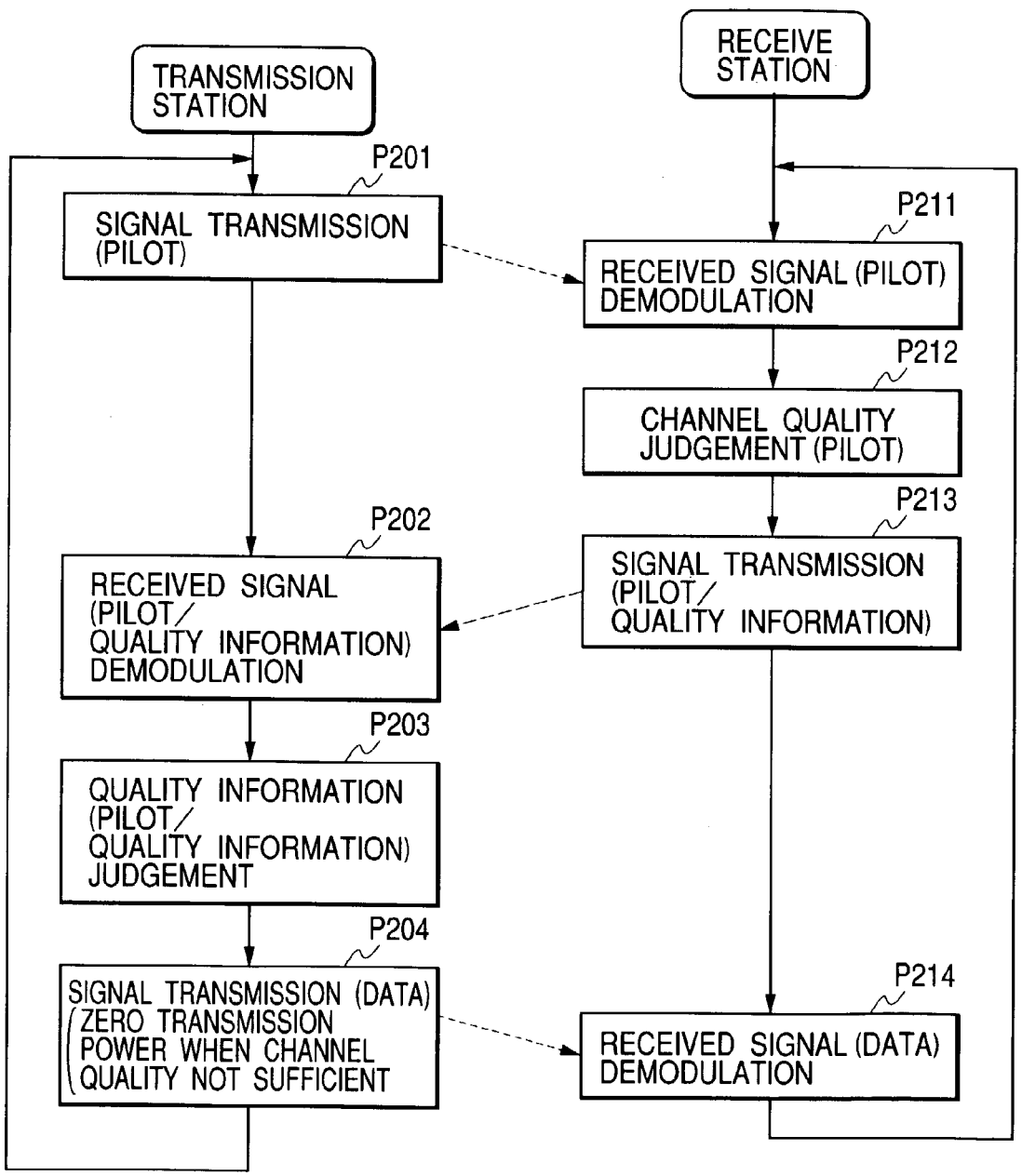
FIG. 7 is a block diagram which shows a typical flow of processes performed by a transmitting station and receiving station according to a second preferred embodiment.

FIG. 7 shows a flowchart that depicts typical processes performed by a transmitting station and receiving station according to the second preferred embodiment.

The transmitting station first performs process P201 to transmit a signal, which contains a pilot signal for channel quality estimation. In a received signal demodulation process P211, the receiving station receives the transmitted signal containing the pilot signal. In a channel quality judgment process P212, the receiving station generates a quality information signal. In a signal transmission process P213, the receiving station transmits a signal containing the quality information. In accordance with the quality information received in a received signal demodulation process P202, the transmitting station judges the channel quality in a quality information judgment process P203. The transmitting station then transmits data in process P204 with a non-zero transmission power selected for the data when the judgment result indicates that the quality is higher than the threshold or with a zero transmission power selected for the data when the indicated quality is lower than the threshold, thereby refraining from transmitting the data.

The quality information to be transmitted in the signal transmission process P213 can be transmitted in the form of information that indicates the magnitude of power, the phase difference, or other relationship to the pilot signal. In such an instance, the signal transmission process P213 transmits a signal containing the quality information and pilot signal. In a received signal demodulation process P202, the transmitting station receives the quality information and the pilot signal. In the quality information judgment process P203, the transmitting station can judge the channel quality from the relationship between the quality information and the pilot signal.

The processes performed by the transmitting station and the receiving station need not always be started and terminated in the sequence indicated by the flowchart in FIG. 7. The successively operating processes may exchange messages with each other as needed to perform a series of processing steps.

Figure 8:
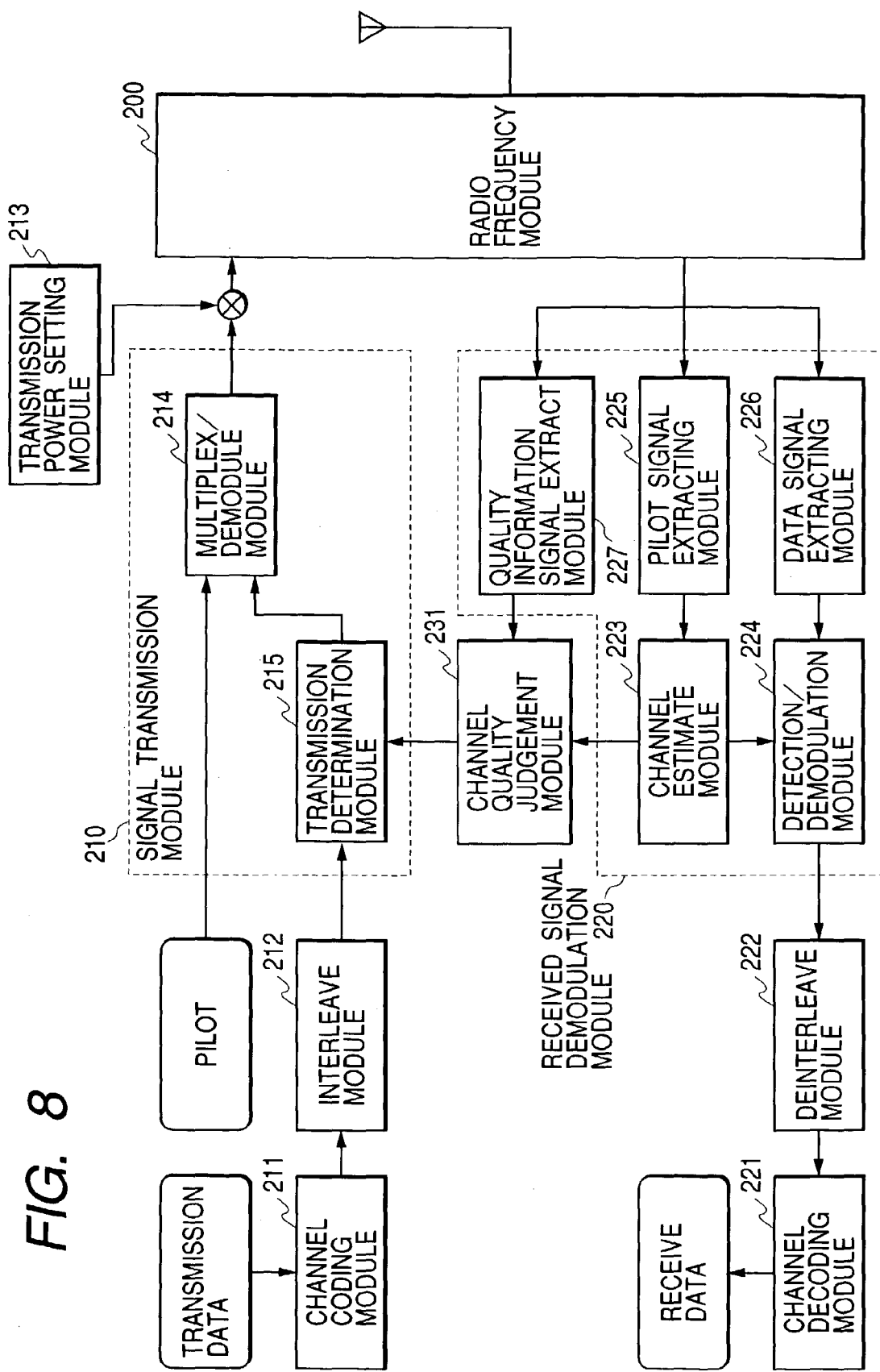
FIG. 8 is a block diagram which shows a typical transmitting station configuration according to the second preferred embodiment.
Figure 9:
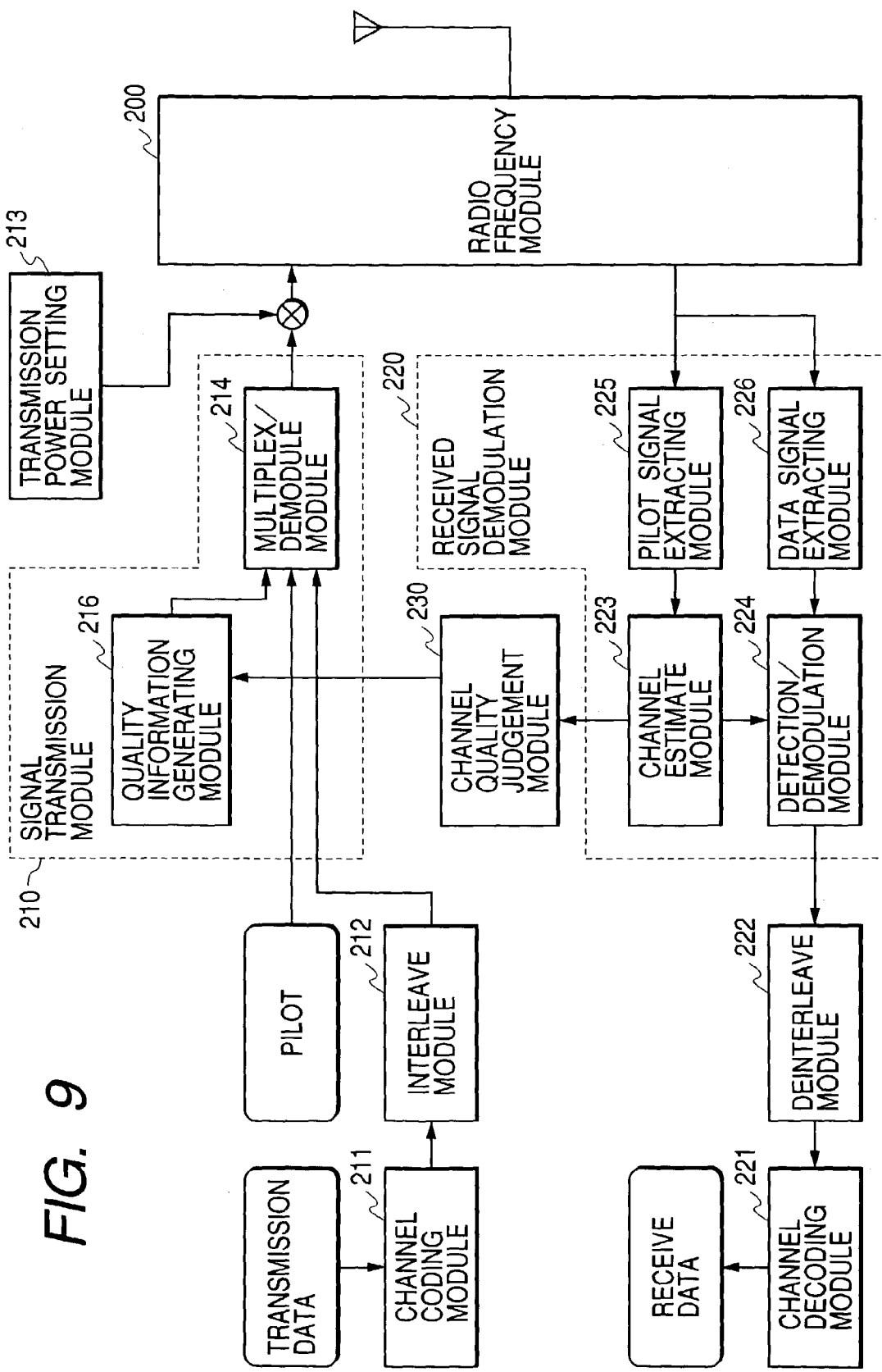
FIG. 9 is a block diagram which shows a typical receiving station configuration according to the second preferred embodiment.

As regards a wireless station embodiment for implementing a control method according to the second preferred embodiment of the present invention, FIG. 8 shows a typical transmitting station configuration and FIG. 9 shows a typical receiving station configuration.

At the transmitting station shown in FIG. 8, transmission data is subjected to channel encoding and interleaving, respectively, in a channel coding module 211 and an interleave module 212. An encoded transmission data signal is then generated and supplied to a transmission signal generating module 210.

In the signal transmission module 210, the pilot signal and encoded transmission data signal are multiplexed and modulated to generate a baseband transmission signal. In this instance, a transmission determination module 215 receives the channel quality judgment results of one or more data transmission channels from a channel quality judgment module 231, and gives a non-zero amplitude to the encoded transmission data signal on a channel whose quality is found to be appropriate for transmission or a zero amplitude to the encoded transmission data signal on a channel whose quality is found to be inappropriate for transmission. As a result, a data transmission for the communication on a single channel will not be sent to a wireless section for a period of time during which the channel quality is low, and a data transmission for the communication on two or more channels will not be sent to a channel whose quality is found to be low.

A transmission power setting module 213 furnishes the baseband transmission signal, which is generated in the transmission signal generating module 210, with transmission power necessary for reception at a receiving station. The baseband transmission signal is then converted to a radio frequency signal in a radio frequency module 200 and transmitted via an antenna.

Meanwhile, the radio frequency signal received by the antenna for the transmitting station shown in FIG. 8 is converted to a baseband reception signal by the radio frequency module 200. The channel gain or noise power measured by a channel estimate module 223 in accordance with the baseband reception signal and the quality information extracted by a quality information signal extracting module 227 are conveyed to a quality information judgment module 231. In accordance with the conveyed channel quality information, the quality information judgment module 231 judges whether the channel quality is appropriate for transmission, and then sends the channel quality judgment result to the transmission determination module 215.

In a signal transmission module 210 of a receiving station, as shown in FIG. 9, the pilot signal, the encoded transmission data signal, and the quality information signal generated by a quality information generating module 216 are multiplexed and modulated to generate a baseband transmission signal. In this instance, the quality information generating module 216 receives the channel quality judgment result from the channel quality judgment module 230, and generates quality information that indicates whether the channel quality is appropriate for transmission.

The transmission power setting module 213 furnishes the baseband transmission signal, which is generated in the transmission signal generating module 210, with transmission power necessary for reception at a transmitting station. The baseband transmission signal is then converted to a radio frequency signal in a radio frequency module 200 and transmitted via an antenna.

Meanwhile, the radio frequency signal received by the antenna for the wireless station shown in FIG. 9 is converted to a baseband reception signal by a radio frequency module 200. The data signal contained in the baseband reception signal is demodulated by a received signal demodulation module 220. As a result of demodulation, a reception data signal is generated. The reception data signal is de-interleaved in a de-interleave module 222 and subjected to channel decoding in a channel decoding module 221. Reception data is then generated. A signal given a zero amplitude at the time of transmission cannot properly be demodulated by the received signal demodulation module 220. However, such a signal is subjected to error correction during a decoding process performed by the channel decoding module 221. As a result, adequate communication is achieved.

The channel gain or noise power measured by the channel estimate module 223 in accordance with the baseband reception signal and the quality information extracted by the quality information signal extracting module 227 are conveyed to the channel quality judgment module 230. In accordance with the conveyed channel quality information, the channel quality judgment module 230 judges whether the channel quality is appropriate for transmission, and then sends the channel quality judgment result to the quality information generating module 216.

In the configuration for the second preferred embodiment, the signal flow and processing flow in the channel quality judgment module 230 are the same as in the channel quality judgment module 230 in the configuration for the first preferred embodiment.

The signal flow and processing flow in the quality information judgment module 231 according to the configuration for the second preferred embodiment will be described with reference to FIGS. 10(*a*) and 10(*b*).

Figure 10A:
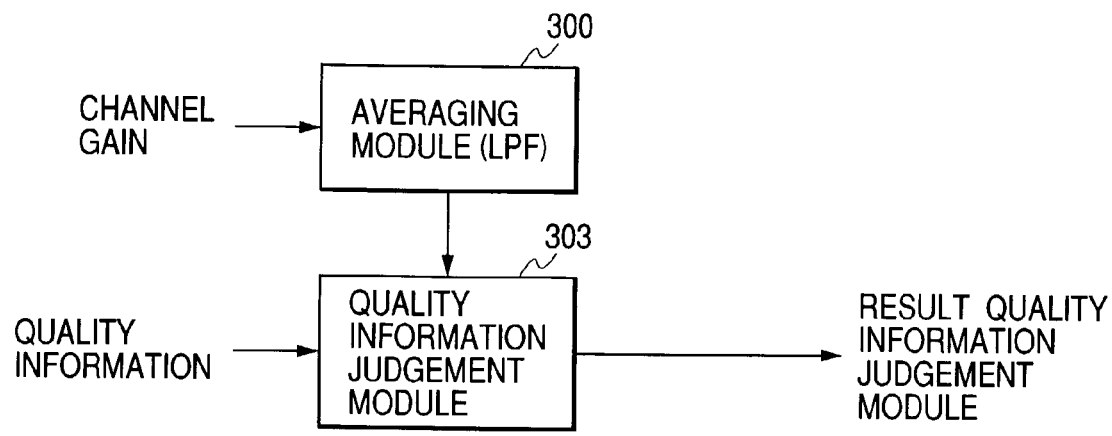
FIG. 10(a) is a block diagram which shows a typical quality information judgment process according to the second preferred embodiment.
Figure 10B:
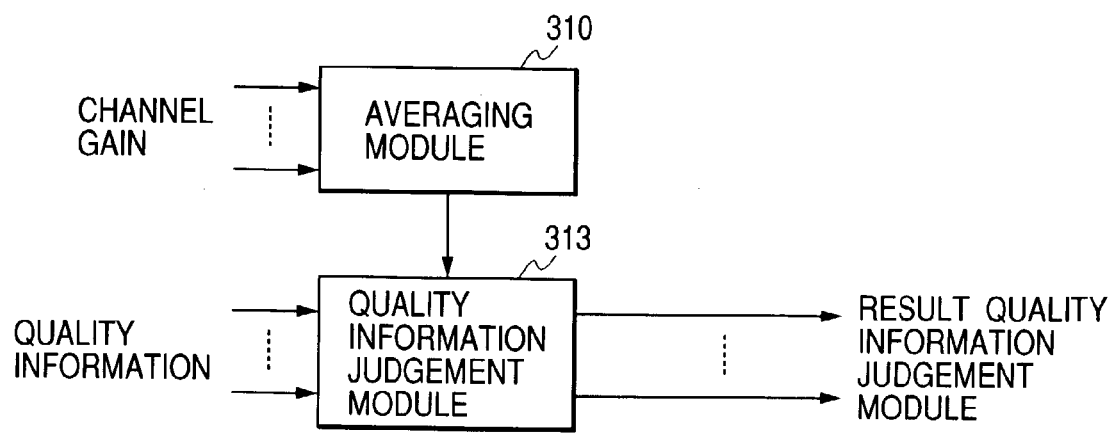
FIG. 10(b) is a block diagram which shows a typical quality information judgment process according to the second preferred embodiment.

The block diagram in FIG. 10(*a*) shows a typical signal flow during a channel quality judgment process that is performed according to the present invention when the channel quality fluctuates with time. The quality information extracted by the quality information signal extracting module and the channel gain averaged by the averaging module 300 are conveyed to the quality information judgment module 303. The quality information judgment module 303 judges the conveyed quality information with reference to the averaged channel gain, and then outputs a quality information judgment result so as to indicate the appropriateness for transmission when the quality information is sufficiently good or to indicate the inappropriateness for transmission when the quality information is not good.

The block diagram in FIG. 10(*b*) shows a typical signal flow during a channel quality judgment process that is performed according to the present invention when the channel quality varies from one channel to another in situations where a plurality of channels are simultaneously used for multicarrier communication or other similar communication.

The quality information for individual channels, which is extracted by the quality information signal extracting module, and the channel gain averaged by the averaging module 310 is conveyed to the quality information judgment module 313. The quality information judgment module 313 judges the conveyed quality information for the individual channels with reference to the averaged channel gain, and then outputs a quality information judgment result so as to indicate the appropriateness for transmission when the quality information is sufficiently good or to indicate the inappropriateness for transmission when the quality information is not good. Alternatively, the instantaneous channel gains of the individual channels, which are conveyed to the averaging module 310, may be time-averaged to determine the time-average channel gain.

In the first and second preferred embodiments, error-correcting codes having a high error correction capability should be used for codes for encoding in the channel coding module 211 and decoding in the channel decoding module 221. For example, decodable superimposed codes based on the Viterbi Algorithm and turbo codes whose error correction capability can be increased by repeated decoding may be used.

When the coefficient multiplication module 301, 311 in the first or second preferred embodiment derives a comparison coefficient, the comparison threshold can be properly controlled depending on the employed modulation method or coding method, for instance, by raising the comparison threshold when the modulation level is relatively low and lowering the comparison threshold when the modulation level is relatively high or by raising the comparison threshold when the code's error correction capability is relatively high and lowering the comparison threshold when the code's error correction capability is relatively low. Further, if the channel gain fluctuation is significantly great depending on the channel gain distribution, the communication stability can be assured by lowering the comparison threshold.

If the percentage of a section within which the channel quality is found by the comparing module 302, 312 to be inappropriate for transmission is increased in situations where a minimum communication speed needs to be guaranteed, the comparison threshold can be lowered to reduce the section within which the channel quality is found to be inappropriate for transmission, which results in preventing transmissions to a wireless section from being suppressed.

In the first and second preferred embodiments, the control method of the present invention is applied so as to use the channel gain as a measure of channel quality. However, the received power and signal-to-noise power ratio prevailing at a channel-quality-judgment station may be alternatively used instead of the channel gain.

The present invention makes it possible to decrease the required transmission power averagely and reduce mutual interference between communications by assigning no transmission power to low-quality channels.

What is claimed is:

1. A wireless communication system for transmitting data from a first wireless station to a second wireless station,
    wherein said first wireless station or said second wireless station includes a channel quality judgment module for judging the quality of a channel between said first wireless station and said second wireless station;
    wherein said first wireless station includes a channel coding module for encoding a data signal and a transmission determination module for determining, at predetermined intervals and in accordance with the channel quality judged as described above, whether or not to transmit said encoded data signal;
    wherein said second wireless station includes an error correction module for correcting errors by decoding an encoded data signal received from said first wireless station; and
    wherein said first wireless station, if said transmission determination module concludes that said encoded data signal should be transmitted, transmits said encoded data signal for at least a predetermined period of time and, if said transmission determination module concludes that said encoded data signal should not be transmitted, suppresses from transmitting said encoded data for a predetermined period of time and transmits a portion after said encoded data signal, which was not sent during the period when said transmission was not made, at the time of sending a transmission during a predetermined period after the predetermined period during which said transmission was not made.

2. The wireless communication system according to claim 1, wherein the length of said period when said transmission was not made is smaller than the code length of said encoded data signal.

3. The wireless communication system according to claim 1, wherein said first wireless station includes a channel quality judgment module, and wherein said channel quality judgment module judges said channel quality in accordance with the channel gain of a channel from said second wireless station to said first wireless station.

4. The wireless communication system according to claim 1, wherein said second wireless station includes a channel quality judgment module, and wherein said channel quality judgment module judges said channel quality in accordance with the channel gain of a channel from said first wireless station to said second wireless station.

5. The wireless communication system according to claim 1, wherein said channel quality judgment module judges said channel quality in accordance with the signal-to-noise power ratio of a received signal.

6. The wireless communication system according to claim 1, wherein the channel quality judgment criteria selected for said channel quality judgment module are based on the code for said encoding.

7. The wireless communication system according to claim 1, wherein the code length of the code used for said encoding varies with said channel quality.

8. The wireless communication system according to claim 1, wherein said first wireless station and said second wireless station establish multicarrier communication to transmit data with a plurality of channels, and wherein said transmission determination module determines whether or not to transmit said encoded data signal on each of said plurality of channels.

9. A transmitting station of a wireless communication system for transmitting data from a transmitting station to a receiving station, comprising:
    a channel coding module for encoding a data signal; and
    a transmission determination module for determining, at predetermined intervals and in accordance with the channel quality prevailing between said transmitting station and a receiving station, whether or not to transmit said encoded data signal,
    wherein said transmitting station, if said transmission determination module concludes that said encoded data signal should be transmitted, transmits said encoded data signal for at least a predetermined period of time and, if said transmission determination module concludes that said encoded data signal should not be transmitted, suppresses from transmitting said encoded data for a predetermined period of time and transmits a portion after said encoded data signal, which was not sent during the period when said transmission is not made, at the time of sending a transmission during a predetermined period after the predetermined period during which said transmission was not made.

10. The transmitting station according to claim 9, further comprising:
    a channel quality judgment module, wherein said channel quality judgment module judges said channel quality in accordance with the condition of a channel from said receiving station to said transmitting station.

11. The transmitting station according to claim 9, wherein the length of said period when said transmission is not made is smaller than the code length of said data signal.

12. The transmitting station according to claim 9, wherein a plurality of channels are used for data transmission, and wherein said transmission determination module determines whether or not to transmit said encoded data signal on each channel.

13. The transmitting station according to claim 9, further comprising:
    an interleave module for interleaving said encoded data signal, wherein said transmitting station transmits said encoded-and-interleaved signal.

14. A method for transmitting data to a receiving station from a transmitting station for wireless communication, comprising the steps of:
    encoding a data signal;
    determining, at predetermined intervals and in accordance with the channel quality prevailing between said transmitting station and said receiving station, whether or not to transmit said encoded data signal;
    transmitting said encoded data signal for at least a predetermined period of time when it is concluded that said encoded data signal should be transmitted;

refraining from transmitting said encoded data for a predetermined period of time when it is concluded that said encoded data signal should not be transmitted; and transmitting a portion after said encoded data signal, which was not sent during the period when said transmitting station refrained from transmitting said encoded data, at the time of sending a transmission during a predetermined period after the predetermined period during which the transmitting station refrained from transmitting said encoded data.

* * * * *